United States Patent [19]

Nagashima

[11] Patent Number: 4,571,833
[45] Date of Patent: Feb. 25, 1986

[54] SAWDUST DISCHARGE PORT

[75] Inventor: Akira Nagashima, Kawasaki, Japan

[73] Assignee: Kioritz Corporation, Tokyo, Japan

[21] Appl. No.: 644,944

[22] Filed: Aug. 28, 1984

[30] Foreign Application Priority Data

Aug. 30, 1983 [JP] Japan .................. 58-133120[U]

[51] Int. Cl.⁴ ............................................. B27B 17/00
[52] U.S. Cl. ................................................. 30/381
[58] Field of Search ............... 30/381, 382, 383, 384, 30/385, 386, 122, 371; 83/795

[56] References Cited

U.S. PATENT DOCUMENTS

| | | | |
|---|---|---|---|
| 3,525,373 | 8/1970 | Kobayashi | 30/381 |
| 3,734,070 | 5/1973 | Kobayashi et al. | 123/65 BA |
| 3,844,360 | 10/1974 | Green et al. | 173/170 |
| 3,857,179 | 12/1974 | Haupt | 30/381 |
| 3,866,320 | 2/1975 | Progl | 30/386 |
| 4,010,544 | 3/1977 | Siman | 30/381 |
| 4,202,096 | 5/1980 | Nagashima | 30/381 |
| 4,402,138 | 9/1983 | Glockle | 30/382 |

*Primary Examiner*—Jimmy C. Peters
*Attorney, Agent, or Firm*—Sheridan Neimark; Karl W. Flocks; A. Fred Starobin

[57] ABSTRACT

Disclosed is a sawdust discharge port which is arranged such that a side wall of a cover member covering a body frame of a chain saw and opened at its lower end and forming one of the constituent elements of the discharge port has a substantially flat outer surface, and an inner surface forming an inclined surface whose lower end edge portion is gently inclined inwardly and downwardly, thereby to permit the side wall to gradually increase in thickness toward its lower end.

1 Claim, 1 Drawing Figure

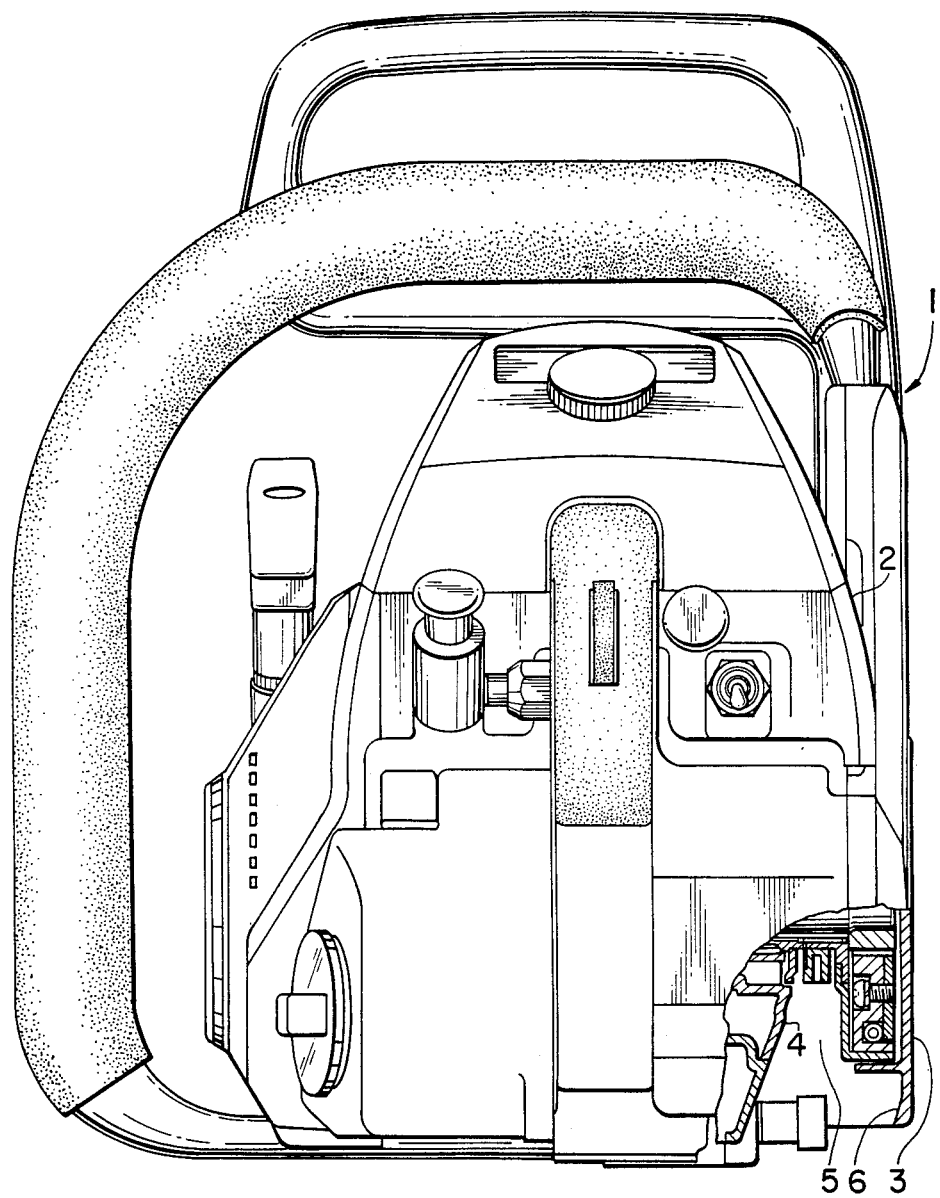

SAWDUST DISCHARGE PORT

BACKGROUND OF THE INVENTION

The present invention relates to the structure of a sawdust discharge port of a chain saw.

Generally, a cover member for the body of a chain saw is made relatively thin as a whole for the purpose of causing a decrease in weight of the chain saw. For this reason, it is necessary, with regard to a side wall thereof particularly at the side of sawing section, to reinforce its lower end edge portion constituting a sawdust discharge port and thereby prevent the side wall from being broken or damaged. To this end, the side wall was conventionally reinforced by being made thicker at its lower end portion in such a manner that its outer surface is allowed to protrude outwardly. By so doing, the inner surface of the side wall is made flat at its lower end portion to prevent a turbulency from occurring in the fluid discharged, thereby making the sawdust discharge smooth. This structure, however, had drawbacks in that, during the sawing operation, the above-mentioned outward protrusion of the side wall at the lower end portion thereof hinders the performance of the operations, or sawdust is very likely to be widely scattered into outside the body of the chain saw.

SUMMARY OF THE INVENTION

The object of the present invention is to provide the structure of a sawdust discharge port of a chain saw which eliminates the drawbacks inherent in the prior art structure and which is simple in construction and easy to manufacture.

The structure of a sawdust discharge port of a chain saw according to the present invention is characterized in that the side wall of a cover member covering a body frame of a chain saw and opened at the lower end has a substantially flattened outer surface, and an inner surface forming an inclined surface whose lower end edge portion is gently inclined inwardly and downwardly, thereby to permit the side wall to gradually increase in thickness toward its lower end.

According to the present invention, therefore, the side wall is reinforced and prevented from being broken or damaged, the portion thereof which obstructs the performance of the sawing operation is removed from the outer surface of the side wall, the sawdust is prevented from being widely scattered outwardly of a main body of the chain saw, and the side wall is provided with a gentle inclined inner surface, thereby to cause an increase in the sawdust flow on the same, thereby to prevent the sawdust from being accumulated on that inner surface of the side wall.

BRIEF DESCRIPTION OF THE DRAWINGS

The drawing is a rear view, partly broken, of a chain saw provided with a sawdust discharge port according to the invention.

DETAILED DESCRIPTION OF THE PREFERRED EMBODIMENT

The construction of the present invention will now be described in accordance with an embodiment thereof illustrated in the drawing.

A chain saw shown generally at 1 in the drawing is of a portable type wherein a small-sized internal combustion engine is built-in as a power source. It has a machine cover 2 made of light metal or plastic material. The portion of the machine cover 2 residing at the side of a sawing section is opened at its lower end. A side wall 3 of the cover 2 defines a sawdust discharge port 5 together with that lower side surface 4 of a body frame which resides at the inside of the side wall 3 and which is disposed in the proximity of the side wall 3. The sawdust discharge port 5 causes the sawdust to drop and discharge outside the machine during a time period in which a saw chain (not shown) is driven to saw or cut a tree or other material desired to be cut.

The side wall 3 has its outer surface made substantially flat and formed with no protrusion. The side wall 3 has, instead, its inner surface formed, at its lower end edge portion, with an inclined surface 6 gently inclined inwardly and downwardly so as to permit the side wall 3 to gradually increase in thickness toward its lower end. By this construction, the flow of sawdust at the lower end of the side wall 3 can be made smooth, the side wall 3 is reinforced and can be prevented from being broken or damaged, and the flow rate of sawdust on the inclined surface 6 is increased, whereby to prevent the sawdust flowing down through the sawdust discharge port 5 from being accumulated on the inner surface of the side wall. It should be noted here that, if said lower side surface 4 is provided such that the inclination thereof is greater than that of said inclined surface 6, then the sawdust will be discharged more reliably.

What is claimed is:

1. A sawdust discharge port defined by a body frame of a chain saw and a side wall of a cover member covering said body frame and opened at its lower end, characterized in that said side wall has a substantially flat outer surface, and an inner surface inclined from the plane of said substantially flat outer surface forming an inclined surface whose lower end edge portion is gently inclined inwardly and downwardly to permit said side wall to gradually increase in thickness toward its lower end, a lower side surface of said body frame defining the sawdust discharge port inclined in substantially the same direction as said lower end edge portion.

* * * * *